(12) United States Patent
Brunks et al.

(10) Patent No.: US 7,642,975 B2
(45) Date of Patent: Jan. 5, 2010

(54) FRAME ASSEMBLY FOR ELECTRICAL BOND

(75) Inventors: Ralph D. Brunks, Stratford, CT (US); Scott M. Mortensen, Newtown, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 12/046,768

(22) Filed: Mar. 12, 2008

(65) Prior Publication Data
US 2009/0231218 A1 Sep. 17, 2009

(51) Int. Cl.
*H01Q 1/28* (2006.01)

(52) U.S. Cl. ...................... 343/705; 343/708

(58) Field of Classification Search ............... 343/705, 343/708, 711, 713
See application file for complete search history.

(56) References Cited

U.S. PATENT DOCUMENTS

| | | | |
|---|---|---|---|
| 3,293,645 A * | 12/1966 | Farley et al. | ............... 343/708 |
| 4,706,089 A | 11/1987 | Weindling | |
| 4,742,358 A | 5/1988 | Raber et al. | |
| 4,791,427 A | 12/1988 | Raber et al. | |
| 5,191,343 A | 3/1993 | Danzer et al. | |
| 5,291,204 A | 3/1994 | Danzer | |
| 5,448,248 A | 9/1995 | Anttila | |
| 5,486,793 A | 1/1996 | Hill | |
| 5,568,095 A | 10/1996 | Hill | |
| 5,575,438 A | 11/1996 | McGonigle et al. | |
| 5,698,316 A | 12/1997 | Kuras et al. | |
| 5,731,756 A | 3/1998 | Roddy | |
| 5,791,654 A | 8/1998 | Gaines et al. | |
| 5,971,325 A | 10/1999 | Gold et al. | |
| 6,121,936 A | 9/2000 | Hemming et al. | |
| 6,357,764 B1 | 3/2002 | Gaines et al. | |
| 6,454,267 B1 | 9/2002 | Gaines et al. | |
| 6,454,276 B2 | 9/2002 | Gaines et al. | |
| 6,694,228 B2 | 2/2004 | Rios | |
| 6,714,163 B2 * | 3/2004 | Navarro et al. | ............... 343/705 |
| 6,719,293 B1 | 4/2004 | Coles et al. | |
| 6,729,576 B2 | 5/2004 | Kay et al. | |
| 6,842,140 B2 | 1/2005 | Killen et al. | |
| 6,859,186 B2 | 2/2005 | Lizalek et al. | |
| 6,885,343 B2 | 4/2005 | Roper | |
| 6,919,846 B2 * | 7/2005 | Koch et al. | ................... 343/705 |
| 7,019,391 B2 | 3/2006 | Tran | |
| 7,098,853 B2 | 8/2006 | McGrath et al. | |
| 7,109,821 B2 | 9/2006 | Engargiola | |
| 7,249,381 B2 | 7/2007 | Telesco | |
| 7,289,079 B2 | 10/2007 | Rupp et al. | |
| 7,295,165 B2 * | 11/2007 | Ferguson et al. | ............ 343/705 |
| 7,397,429 B2 * | 7/2008 | Crain et al. | ........... 343/700 MS |

* cited by examiner

*Primary Examiner*—Hoang V Nguyen
(74) *Attorney, Agent, or Firm*—Carlson, Gaskey & Olds

(57) ABSTRACT

A frame assembly for a composite panel includes a first frame having a first frame contact surface transverse to a first frame mount surface and a second frame having a second frame contact surface transverse to a second frame mount surface, the first frame mount surface receivable within the second frame mount surface to provide a conductive communication path therebetween.

18 Claims, 5 Drawing Sheets

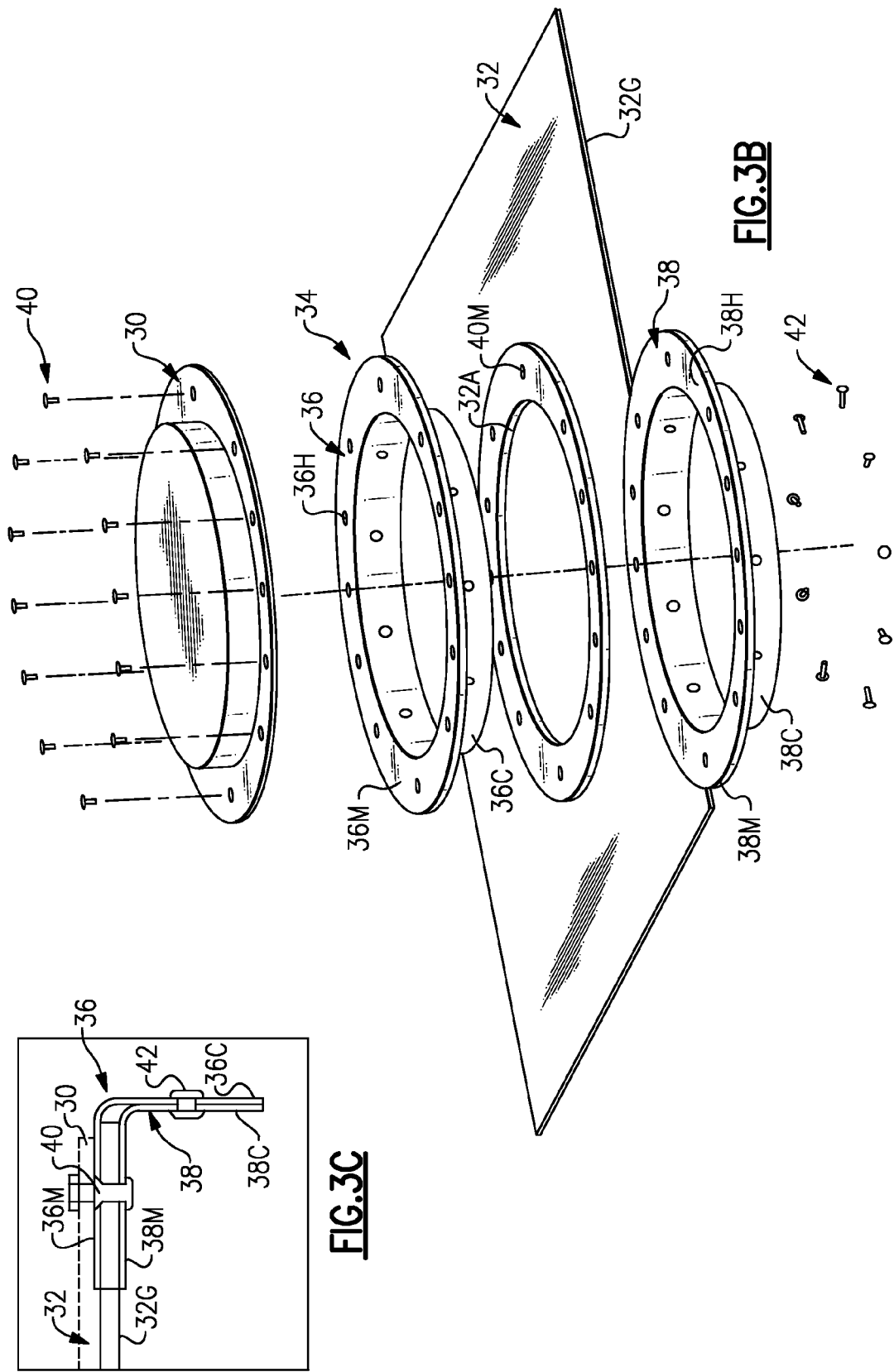

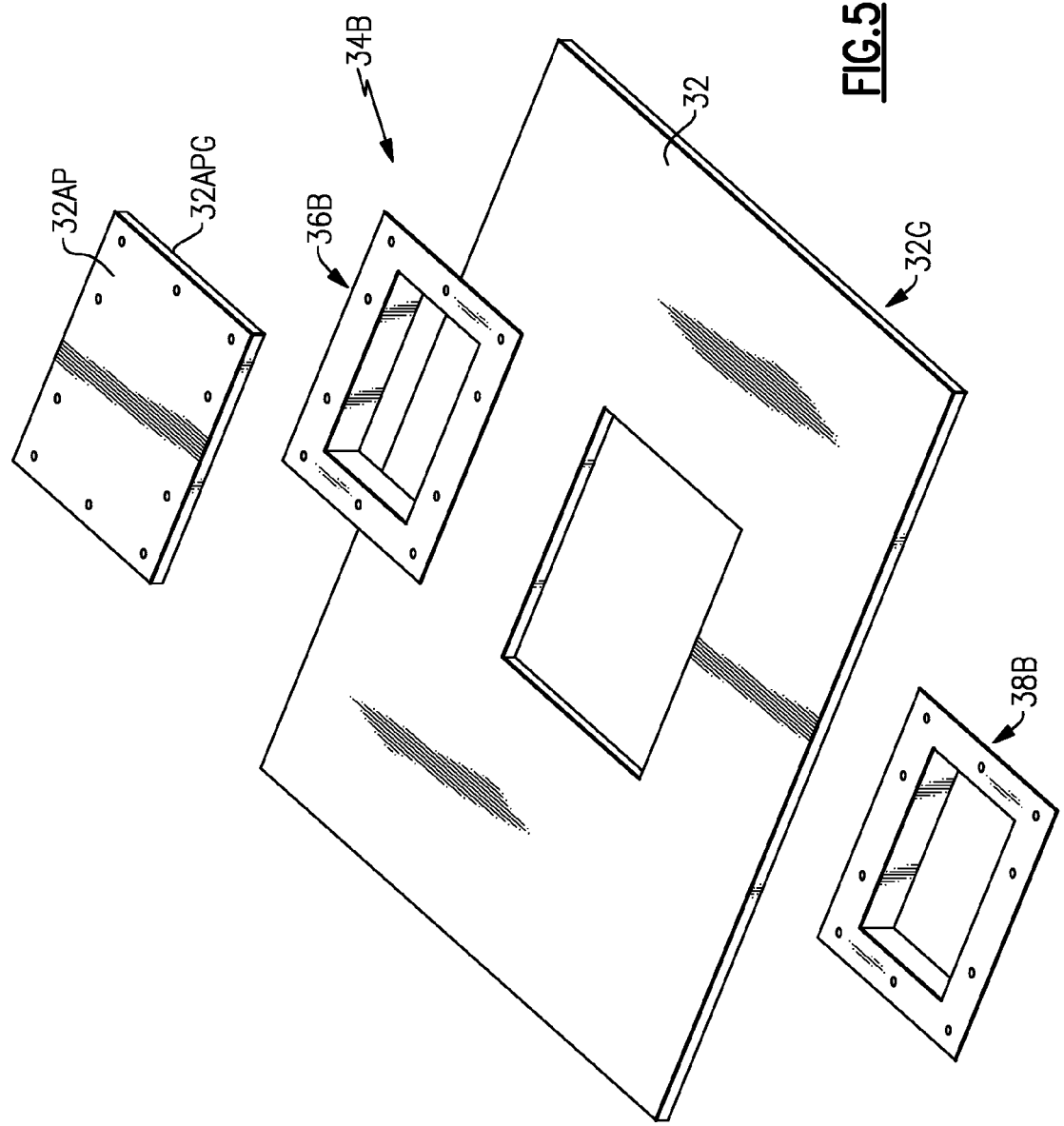

FRAME ASSEMBLY FOR ELECTRICAL BOND

BACKGROUND

The present invention relates to a frame assembly which provides an electrical bond surface for a component installed on an opposite side of a screened mesh composite panel.

External electromagnetic fields, referred to as EMI effects, can disrupt the operation of on board electronic components through generation of unwanted voltage and current fluctuations in the wiring. These EMI effects may potentially damage the electronic components.

A common method of mitigating the potential damage from EMI effects is to place a continuous conductive shield around the electronic components which may be at risk. Often a metallic outer skin of the aircraft operates as such a shield. However, portions of an aircraft skin are often manufactured from composite materials which are relatively poor conductors and are not effective shields against EMI effects. The composite material thereby often incorporate a metallic conductive layer or wire mesh as part of the composite skin panel to operate as a conductor and form at least a portion of an aircraft electrical ground plane.

On some aircraft, the aircraft composite skin may mount various antennas. For the antenna to achieve proper performance, a conductive path between the antenna and the metallic conductive layer is required. The conductive path between the antenna and the metallic conductive layer may be conventionally provided by a bond strap or other procedure.

One procedure utilizes aluminum tape affixed to the exposed screen mesh on an interior surface of the composite panel and wrapped around the circumference of the antenna mount opening to an exterior surface. The antenna is then mounted on the exterior surface of composite panel and in contact with the aluminum tape to provide communication with the aircraft electrical ground plane.

Although effective, each piece of aluminum tape must be laboriously cut and applied which may induce variability in the application. Each piece of tape must also be edge sealed to reduce the likelihood of any portions of the tape peeling away from the contacting surfaces and minimize moisture communication under the tape. Disadvantageously, even when consistently applied, the aluminum tape may not provide a consistent electrical connection while the degree of electrical conductivity is dependent on the area of surface contact through the adhesive side of the tape which is for the most part non-conductive.

SUMMARY

A frame assembly according to an exemplary aspect of the present invention includes: a first frame having a first frame contact surface transverse to a first frame mount surface; and a second frame having a second frame contact surface transverse to a second frame mount surface, the first frame mount surface receivable within the second frame mount surface to provide a conductive communication path therebetween.

A composite panel according to an exemplary aspect of the present invention includes: a composite panel having an electrically conductive surface and an aperture therethrough; a first frame having a first frame contact surface transverse to a first frame mount surface, the first frame contact surface mounted to an outer surface of the composite panel about a periphery of the aperture, the first frame surface extends at least partially into the aperture; and a second frame having an second frame contact surface transverse to a second frame mount surface, the second frame contact surface mounted to an inner surface of the composite panel about the periphery of the aperture and in contact with the electrically conductive surface, the first frame mount surface receivable within the second frame mount surface to provide a conductive communication path therebetween.

A method of mounting an antenna within a composite panel according to an exemplary aspect of the present invention includes: sandwiching a composite panel having an electrically conductive surface on an internal surface of the composite panel between a first frame and a second frame, a first frame mount surface receivable within a second frame mount surface to provide a conductive communication path therebetween; and mounting an antenna to the first frame, the antenna having a conductive communication path through the first frame and the second frame to the electrically conductive surface.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows:

FIG. 3B is an exploded view a frame assembly for an antenna;

FIG. 3C is a sectional view of the frame assembly of FIG. 3BA taken along line 3C-3C in FIG. 3B;

FIG. 5 is an exploded view of another non-limiting embodiment of a frame assembly for an access panel to provide a contiguous EMI shield.

DETAILED DESCRIPTION OF THE DISCLOSED EMBODIMENT

Figure 1:
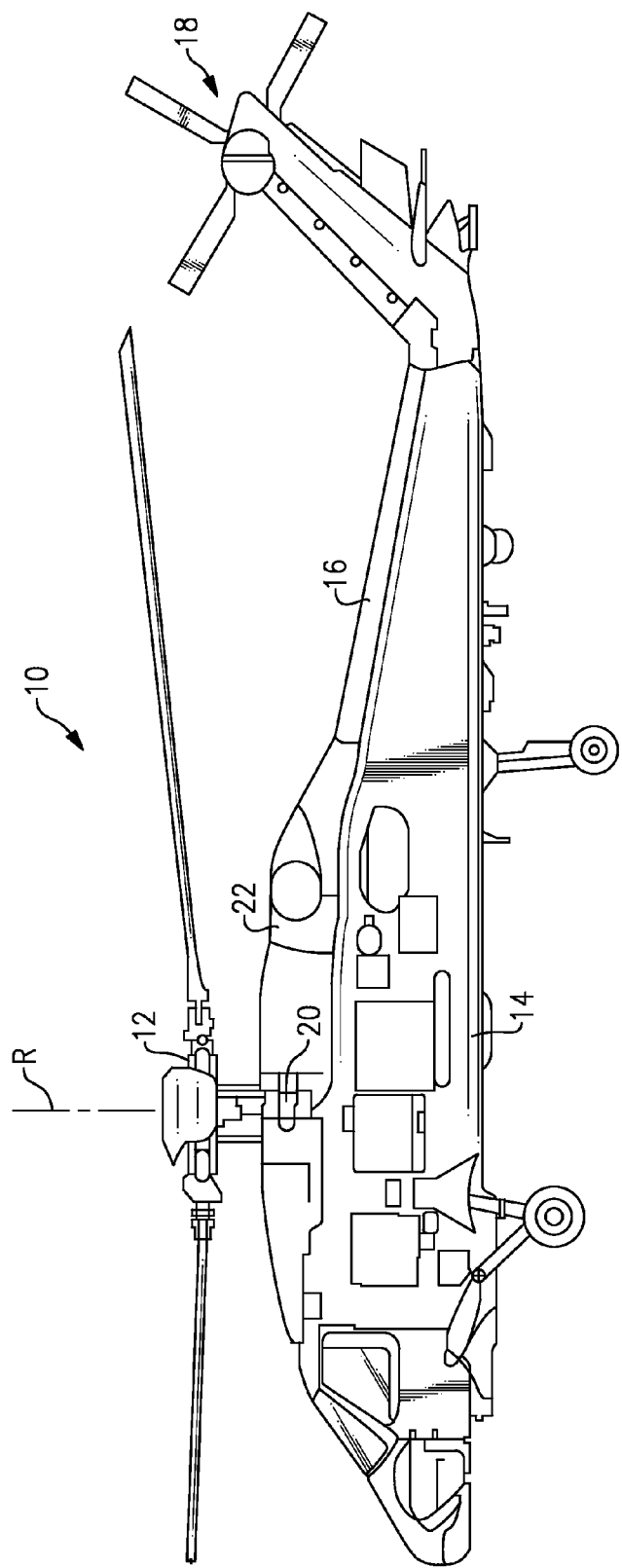
FIG. 1 is a general perspective view of one exemplary rotary wing aircraft embodiment for use with the present invention.

FIG. 1 schematically illustrates an exemplary vertical take-off and landing (VTOL) rotary-wing aircraft 10. The aircraft 10 in the disclosed, non-limiting embodiment includes a main rotor system 12 supported by an airframe 14 having an extending tail 16 which mounts an anti-torque system 18 such as a tail rotor system. The main rotor assembly 12 is driven about an axis of rotation R through a main gearbox (illustrated schematically at 20) by one or more engines 22. The main rotor system 12 includes a multiple of rotor blades 24 mounted to a rotor hub 26. Although a particular helicopter configuration is illustrated and described in the disclosed embodiment, other configurations and/or machines, such as fixed wing aircraft, tilt-rotor aircraft, tilt-wing aircraft, land vehicles and water vehicles will also benefit herefrom.

Figure 2:
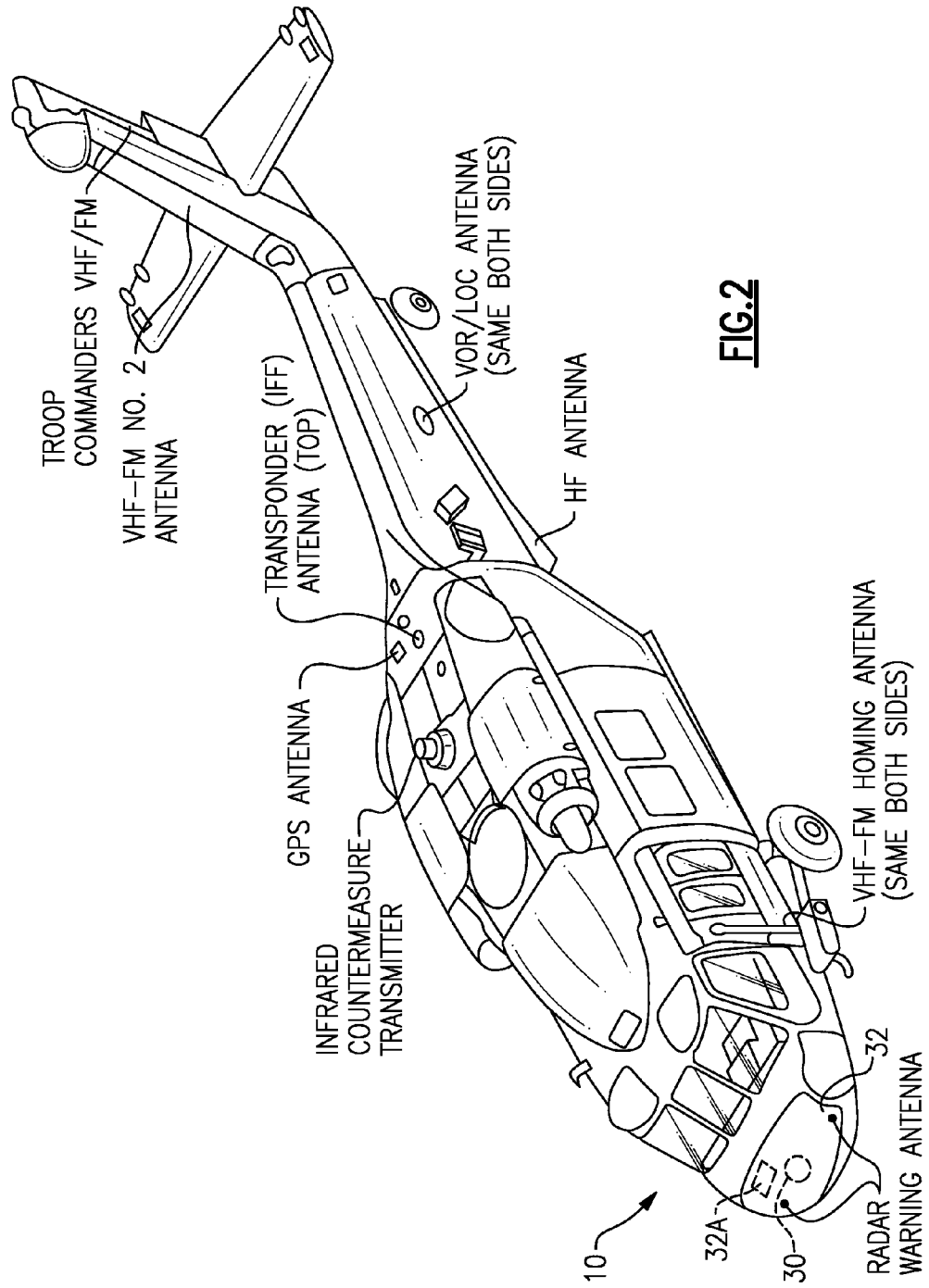
FIG. 2 is a general perspective view of the rotary wing aircraft embodiment of FIG. 1 illustrating an antenna mount location.
Figure 3A:
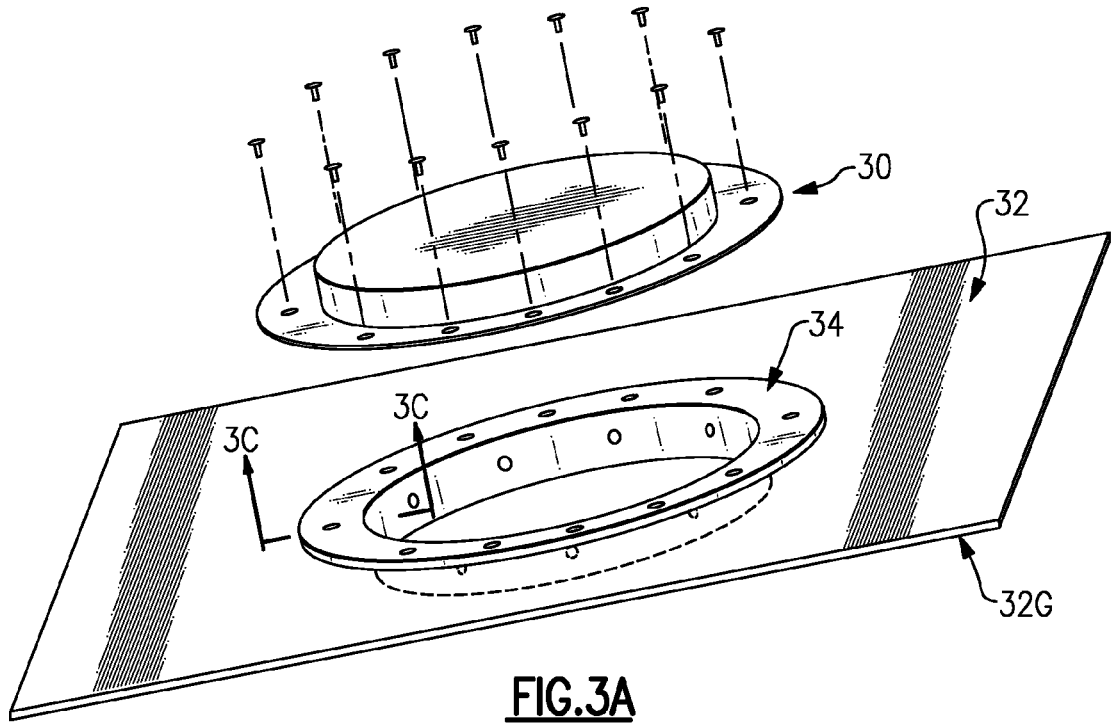
FIG. 3A is an exploded view of a frame assembly for mount of an antenna.

Referring to FIG. 2, the aircraft 10 often includes an electrical component 30 mounted within a composite panel 32 having an exposed electrically conductive surface 32G such as a wire mesh screen on an interior surface of the composite panel 32 to define, at least in part, an aircraft electrical groundplane (FIG. 3A). It should be understood that "component" as used herein may include any navigation, identification, alert system, radar warning receiver, IFF system and the like which utilize an antenna or other transmitter/receiver which need communicate with an aircraft electrical groundplane. Alternatively, the component 30 need not be an antenna but any removable structure such as an access panel within the composite panel 32.

Referring to FIG. 3B, the component 30 is mounted at least partially within an aperture 32A of the composite panel 32. A frame assembly 34 retains the component 30 within or adjacent the aperture 32A and provides for electrical communication between the component 30 and the exposed electrically conductive surface 32G on the interior surface of the composite panel 32.

The frame assembly 34 includes an outer frame 36 and an inner frame 38. The frames 36, 38 may be manufacture from a conductive material such as aluminum. It should be understood that although an annular frame assembly 34 is illustrated in the disclosed non-limiting embodiment, any shape may alternatively or additionally be provided to receive the component 30 or otherwise provide for a continuous conductive path.

The outer frame 36 is mountable to an outer surface of the composite panel 32 and the inner frame 38 is mountable to the inner surface of the composite panel 32 to contact the electrically conductive surface 32G and thereby communicate with the aircraft electrical groundplane. The outer frame 36 includes a contact surface 36C which is transverse to a mount surface 36M (also illustrated FIG. 3C). The inner frame 38 includes a contact surface 38C which is transverse to a mount surface 38M (also illustrated FIG. 3C).

A multiple of fasteners 40 such as screws, rivets or such like hardware are mounted though the mount surface 36M, the composite panel 32 and the mount surface 38M to affix the outer frame 36 and inner frame 38 to the composite panel 32 about the aperture 32A. The fasteners 40 may additionally be utilized to mount the component 30 to the composite panel 32. The composite panel contact areas may be prepared specifically for each particular installation though location of mount holes 40M predrilled in the composite panel 32 which align with holes 36H, 38H in the respective corresponding outer frame 36 and inner frame 38 mount surface 36M, 38M coordinates.

The outer frame 36 mount surface 36M provides an electrical contact area for the component 30 while the inner frame 38 mount surface 38M provides electrical contact with the electrically conductive surface 32G. An effective metal-to-metal electrical bond though the contact surfaces 36C, 38C of the frame assembly 34 to provide for a conductive path between the component 30 and the electrically conductive surface 32G. As the component fasteners 40 are tightened, the component 30 makes electrical contact with outer frame 36 through to the inner frame 38 and ultimately to the electrically conductive surface 32G on the inside of the composite panel 32. Edge sealing may additionally be applied to exposed areas of the frame assembly 34 and the inner and outer areas of the composite panel 32.

A multiple of fasteners 42 such as a screws, rivets or such like hardware are mounted though the contact surfaces 36C, 38C to provide electrical contact between the outer frame 36 and the inner frame 38 within the aperture 32A (FIG. 3B). The electrical groundplane is thereby transferred from the electrically conductive surface 32G, through the inner frame 38 and to the outer frame 36 via the frame-to-frame contact surface 36C, 38C interface.

The frame assembly 34 provides consistent positive electrical contact with the electrically conductive surface 32G though through compression by the fasteners 40 which sandwich the composite panel 32 between the mount surface 36M, 38M rather than via pressure contact through a mostly non-conductive adhesive. The frame assembly 34 contact is readily duplicated from installation to installation by any installer. The frame assembly 34 also provides an effective electrical bonding-mating surface for the component 30 yet can be removed, cleaned, properly surface prepared, and reinstalled in the field by any maintenance personnel if necessary.

Figure 4:
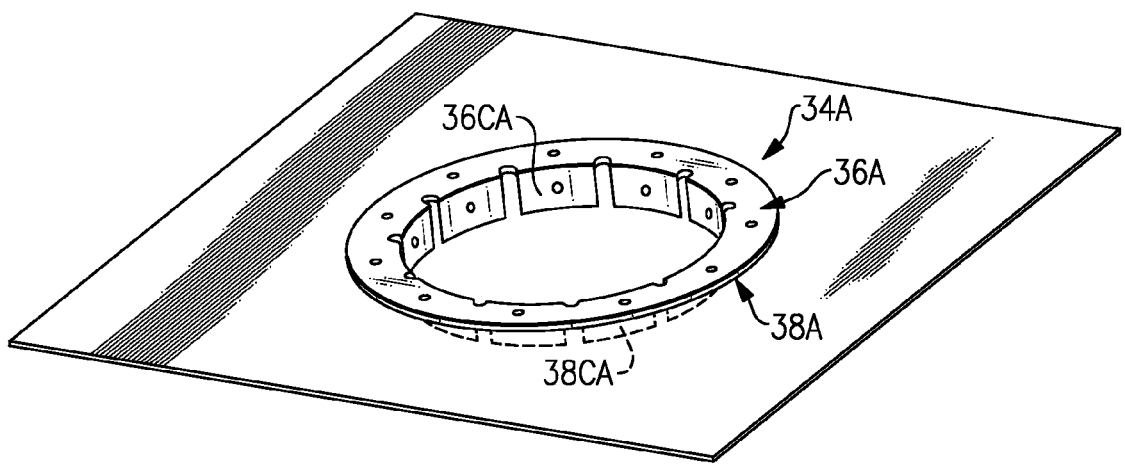
FIG. 4 is an exploded view of another non-limiting embodiment of a frame assembly for an antenna.

Referring to FIG. 4, a frame assembly 34A in accords with another non-limiting embodiment provides segmented contact surfaces 36CA, 38CA. The segmented contact surfaces 36CA, 38CA facilitate a light weight structure and installation in non planar panels.

Referring to FIG. 5, a frame assembly 34B in accords with another non-limiting embodiment provides a continuous conductive path between adjacent panels such as an access panel 32AP within the composite panel 32. That is, the component 30 may be the access panel 32AP with an electrically conductive surface 32APG which interfaces with the electrically conductive surface 32G within the composite panel 32 through the frame assembly 34B to provide a contiguous EMI shield.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A frame assembly comprising:
    a first frame having a first frame contact surface transverse to a first frame mount surface; and
    a second frame having a second frame contact surface transverse to a second frame mount surface, said first frame contact surface receivable within said second frame contact surface, said first frame contact surface and said second frame contact surface include a multiple of corresponding apertures to receive a multiple of respective fasteners which provide contact between said first frame contact surface and said second frame contact surface to provide a conductive communication path therebetween.

2. The assembly as recited in claim 1, further comprising a component mountable to said first frame.

3. The assembly as recited in claim 2, wherein said component is an antenna.

4. The assembly as recited in claim 2, wherein said component is an access panel.

5. A frame assembly comprising:
a first frame having a first frame contact surface transverse to a first frame mount surface; and
a second frame having a second frame contact surface transverse to a second frame mount surface, said first frame contact surface receivable within said second frame contact surface to provide a conductive communication path therebetween, said first frame mount surface and said second frame mount surface include a multiple of corresponding apertures.

6. The assembly as recited in claim 5, wherein said multiple of apertures correspond with a multiple of component apertures though a component.

7. The assembly as recited in claim 6, wherein said component is an antenna.

8. The assembly as recited in claim 6, wherein said component is an access panel.

9. A composite panel assembly comprising:
a composite panel having an electrically conductive surface and an aperture therethrough;
an first frame having a first frame contact surface transverse to a first frame mount surface, said first frame mount surface mounted to an outer surface of said composite panel about a periphery of said aperture, said first frame contact surface extends at least partially into said aperture; and
an second frame having a second frame contact surface transverse to a second frame mount surface, said second frame mount surface mounted to an inner surface of said composite panel about said periphery of said aperture and in contact with said electrically conductive surface, said first frame contact surface receivable within said second frame contact surface to provide a conductive communication path therebetween.

10. The assembly as recited in claim 9, wherein said first frame contact surface and said second frame contact surface include a multiple of corresponding apertures to receive a multiple of respective fasteners which provide contact between said first frame contact surface and said second frame contact surface.

11. The assembly as recited in claim 9, wherein said first frame mount surface and said second frame mount surface sandwich said composite panel therebetween.

12. The assembly as recited in claim 11, wherein said first frame mount surface and said second frame mount surface include a multiple of corresponding apertures to receive a multiple of respective fasteners.

13. The assembly as recited in claim 12, wherein said multiple of apertures correspond with a multiple of component apertures though a component.

14. The assembly as recited in claim 13, wherein said component is an antenna.

15. The assembly as recited in claim 13, wherein said component is an access panel.

16. The assembly as recited in claim 9, wherein said first frame mount surface and said second frame mount surface are segmented.

17. A method of mounting an antenna within a composite panel comprising:
sandwiching a composite panel having an electrically conductive surface on an internal surface of said composite panel between a first frame and a second frame, a first frame contact surface receivable within a second frame contact surface to provide a conductive communication path therebetween; and
mounting an antenna to the first frame, the antenna having a conductive communication path through the first frame and the second frame to the electrically conductive surface.

18. A method as recited in claim 17, wherein the composite panel is an aircraft panel.

* * * * *